Aug. 9, 1927.

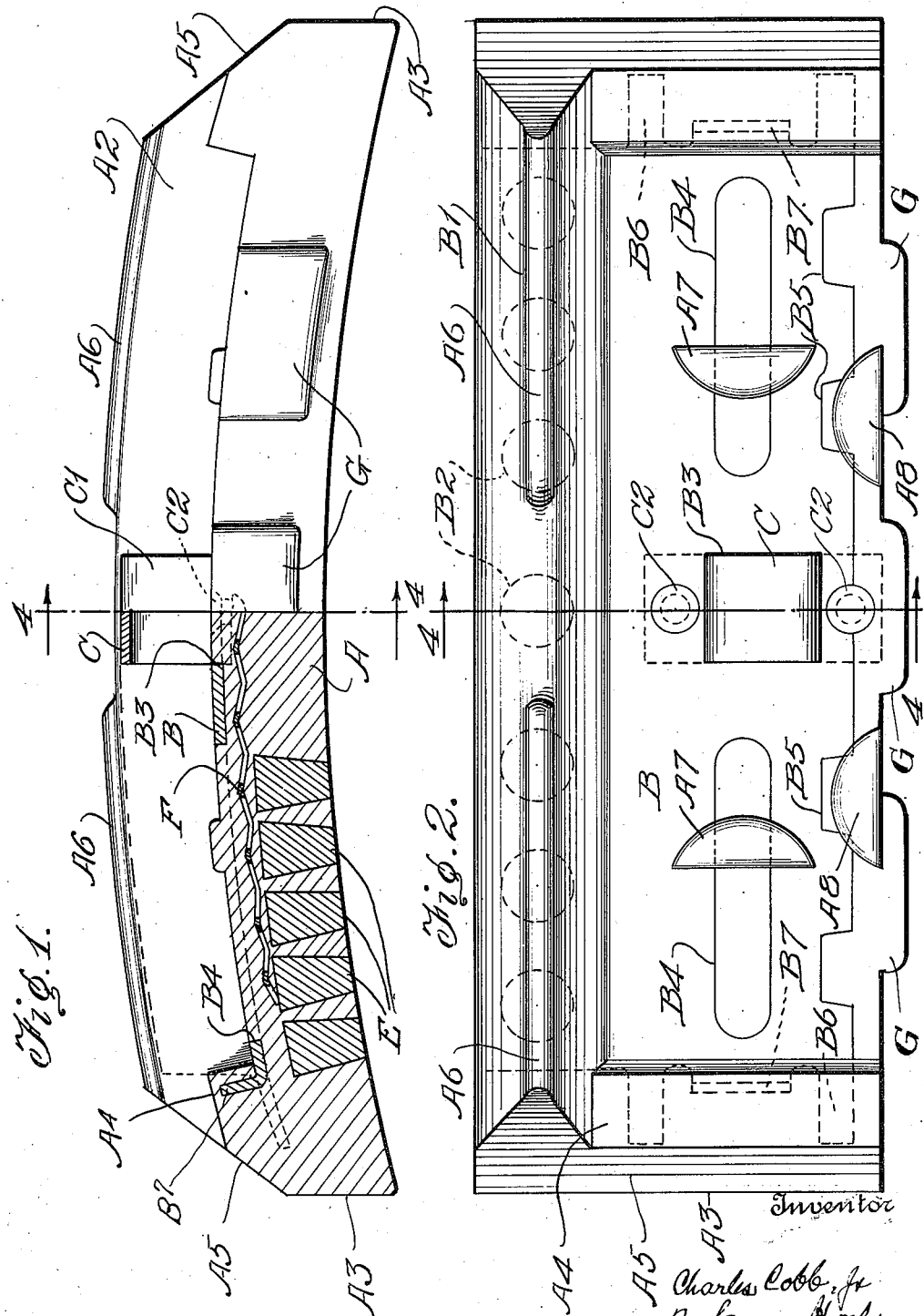

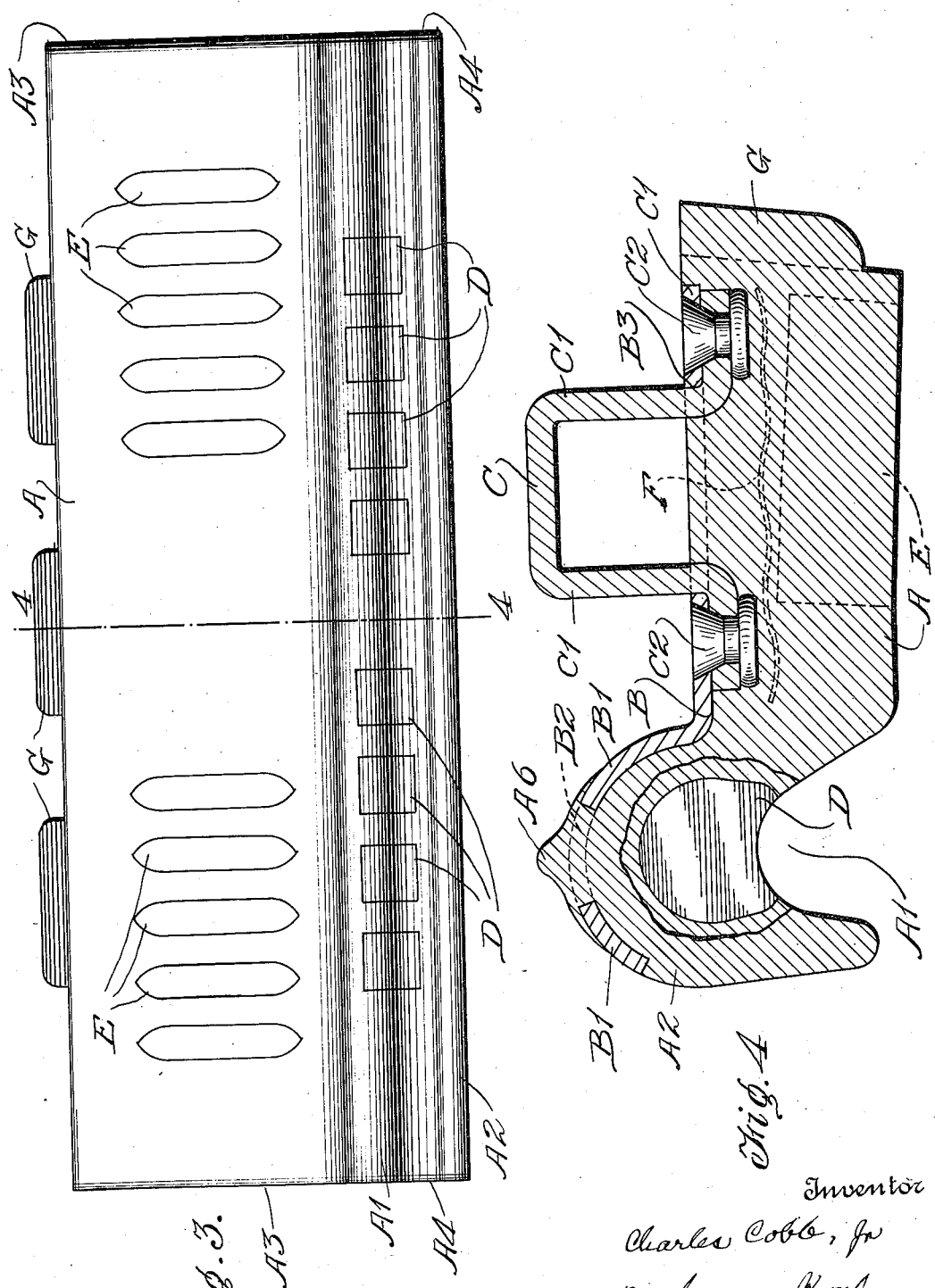

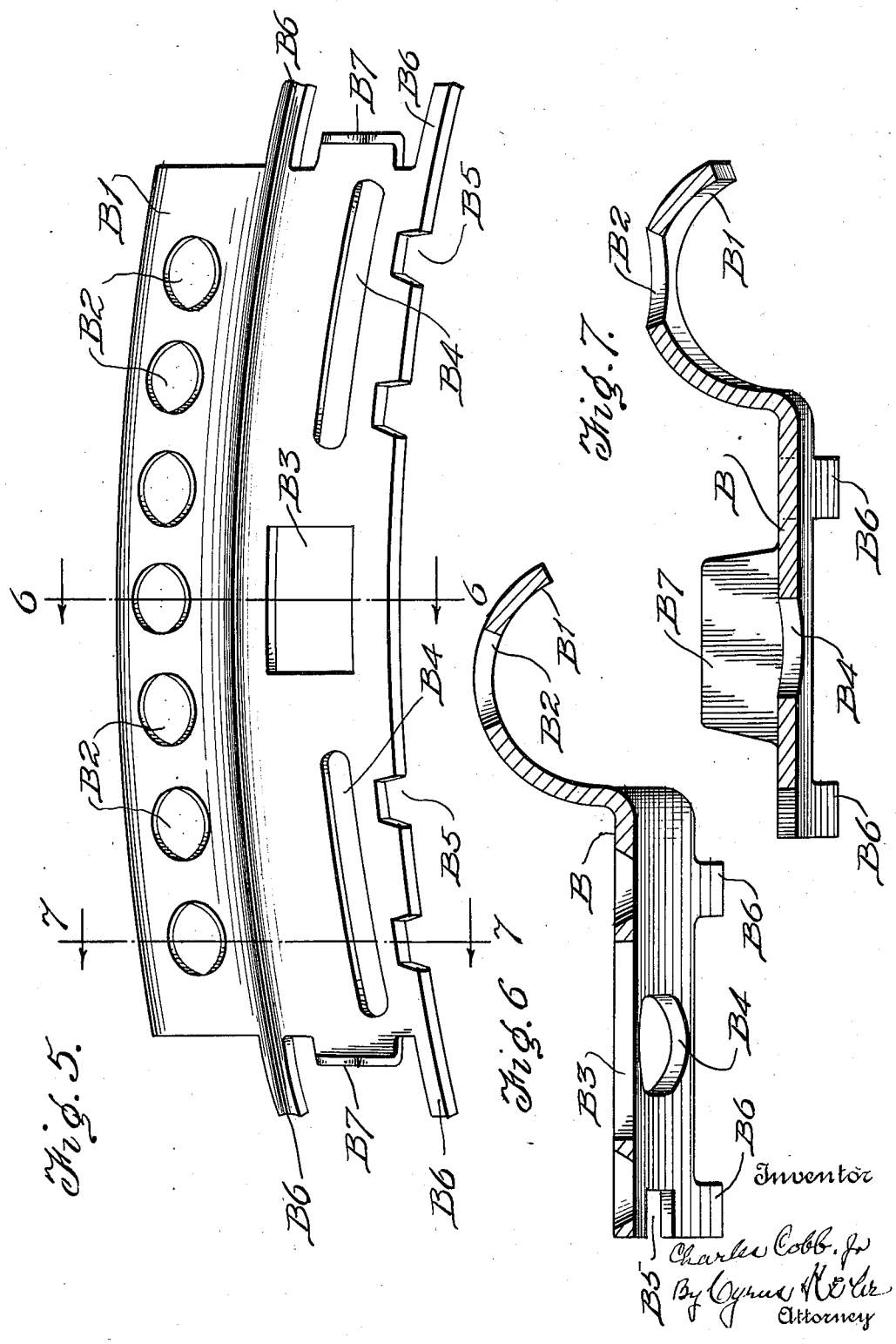

C. COBB, JR 1,638,759

BRAKE SHOE

Filed May 18, 1926

Inventor
Charles Cobb, Jr.
By Cyrus Kehr
Attorney

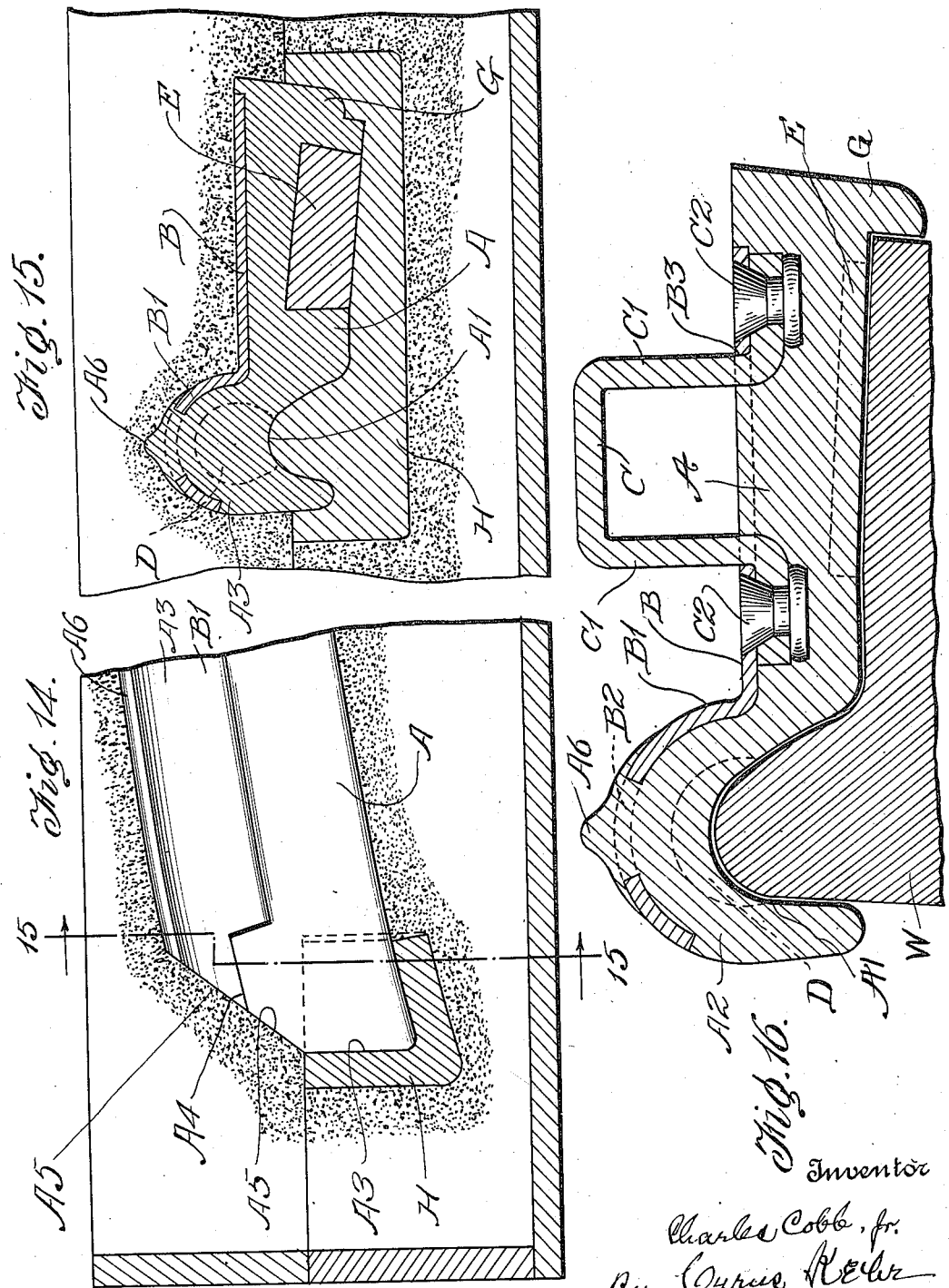

Patented Aug. 9, 1927.

1,638,759

UNITED STATES PATENT OFFICE.

CHARLES COBB, JR., OF MARSHALL, TEXAS.

BRAKE SHOE.

Application filed May 18, 1926. Serial No.109,900.

This invention relates to brake shoes to be applied to brake equipment to engage the drive wheels of railway locomotives. In practice it is recognized that brake shoes for locomotive drive wheels or "drivers" require large weight and strength and special form to adapt them for effective braking and for durability.

This invention is especially applicable to cast metal brake shoes, the body of the shoe having embedded in it pieces of reinforcing metal and pieces or inserts of metal serving to chill the adjacent surfaces of the cast metal.

The object of this invention is to provide a cast metal brake shoe in which parts are chilled by metal pieces embedded in the casting and in which other parts are chilled by contact of the molten metal with metal surfaces made a part of the mold.

A further object of the invention is to provide in the shoe special strength for parts which are subjected to extra strains or extra wear, and to form the shoe to adapt it to be held accurately in place on the driver, all as hereinafter described.

In the accompanying drawings,

Fig. 1 is a sectional edge elevation of a brake shoe constructed according to my invention;

Fig. 2 is an elevation showing the back of the same shoe as viewed looking toward the right as shown in Fig. 1;

Fig. 3 is an elevation of the inner or concave face of the shoe;

Fig. 4 is a transverse horizontal section on the line, 4—4, of Figs. 1, 2 and 3;

Fig. 5 is a perspective of a back plate forming a part of the shoe;

Fig. 6 is a transverse section on the line, 6—6, of Fig. 5, looking in the direction of the arrow;

Fig. 7 is a transverse section on the line, 7—7, of Fig. 5, looking in the direction of the arrow;

Fig. 14 is an upright section of one half of a mold in which one of these shoes is to be cast;

Fig. 15 is a transverse section on the line, 15—15, of Fig. 14, the chilling blocks and the back plate being in position and the molten metal having been poured;

Fig. 16 is a view like Fig. 4, the metal on the inner face of the shoe having been worn away and a cross-section of a part of the driver having been added.

Figure 10:
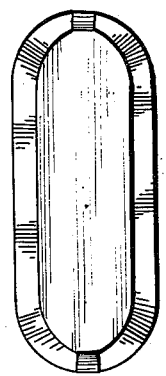
Figs. 9, 10 and 11, are respectively, an elevation, a plan, and a transverse section of one of the chilling blocks put into the flat inner face of the shoe.

Referring to the drawings, the structure of the finished shoe will first be described. Thereafter the manner of forming the mold and the pouring of the molten metal will be described.

The main parts of this shoe are the cast body, A, and the plate steel or wrought iron back, B. The concave inner face of the body, A, is curved to conform to the exterior of the locomotive drive wheels to which the shoe is to be applied. This shaping includes the groove or channel, $A^1$, which is to receive the flange of the driver or wheel, W (Fig. 16). To provide sufficient metal back of the groove or channel, $A^1$, the cast body has an outward extension, $A^2$, reaching from end to end of the shoe. Each end of the shoe has a transverse face, $A^3$, in front of which is a transverse extension, $A^4$, which has a slanting face, $A^5$.

The back, B, is partially embedded in the cast body, A. The main part of said back is flat. An auxiliary part, $B^1$, is curved to conform to the back face of the extension, $A^2$, of the cast body, A. Along the part, $B^1$, the back has apertures, $B^2$, through which the cast metal of the body, A, reaches to engage and hold the back. Figs. 1, 2, 4, 15 and 16 show the cast metal extended above the apertures, $B^2$, and spread on the outer face of the plate, B, and Figs. 1 and 2 show this cast metal on the back in the form of a continuous rib, $A^6$, extending over all excepting the middle aperture. These apertures, $B^2$, are shown circular; but they may be of any desired form.

On the flat part of the back, midway between its ends, there is a rectangular opening, $B^3$, which receives the loop, C. The loop has feet, $C^1$, which overlap the inner face of the plate, B. Rivets, $C^2$, extend through each foot and the adjacent part of the back, B, to secure the loop to the back. The heads of the rivets are embedded in the cast body, A. This loop is used for making engagement between the brake shoe and the brake beam in the usual manner.

Between each end of the plate, B, and the loop, the plate has a longitudinal slot, $B^4$, through which the cast metal of the body, A, extends and partially covers the plate adjacent the slot. The drawings show, for this purpose, a lug, $A^7$, of the cast metal formed to extend across the slot, $B^4$, and the adjacent outer face of the plate, B. At its edge which is adjacent the loop, C, the plate, B, has notches, $B^5$, into which the cast metal extends for the purpose of making stronger engagement between the plate and the cast metal. To increase this engagement, lugs, $A^8$, are formed on the body, A, at two of these notches to extend over adjacent parts of the back.

At each end corner of the flat part of the plate, B, there is a tongue, $B^6$, parallel to the length of the plate and embedded in the back extension, $A^4$, extending transversely across the body, A, as above stated. At each end of the plate, B, and between the tongues, $B^6$, there is a tongue, $B^7$, turned outward to stand perpendicular to the adjacent part of the plate. This tongue, $B^7$, is also embedded in the extension, $A^4$, of the body, A.

Figure 12:
Figs. 12 and 13 are, respectively, a plan and an elevation of one of the chilling blocks embedded in the channel of the inner face of the shoe.
Figure 13:
Figure 8:
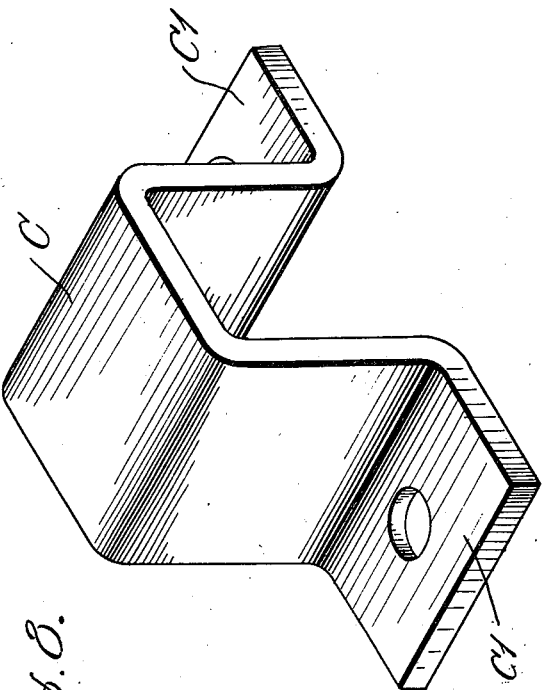
Fig. 8 is a perspective of a loop fixed rigidly on the back of the shoe.

In the groove or channel, $A^1$, are metal blocks or inserts, D, of approximately three quarter moon shape. One of these inserts is shown separately by Figs. 12 and 13. The concave face of each insert is flush with the adjacent face of the channel, $A^1$. The drawings show eight of these inserts arranged in groups of four at opposite sides of the middle transverse plane of the shoe. The function of these inserts will be explained further on.

Figure 9:
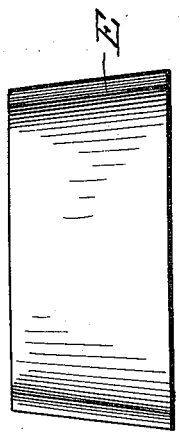
Figure 11:
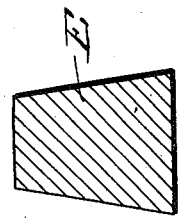

In the flat face of the cast body, A, elongated inserts, E, are placed in planes transverse to the length of the shoe. These inserts are shown tapering or wedge-form in cross-section, and the narrow face of each insert is flush with the adjacent inner face of the body, A. But space is preferably left between the ends of the inserts, E, and the part of the mold which is to form the adjacent side edge of the body, A, as shown by the drawings. One of these inserts is illustrated by Figs. 9, 10 and 11.

Between the inserts, E, and the back, B, is a sheet of woven wire or reticulated metal, F. This serves as a reinforcing member.

On the edge of the cast body, A, which is adjacent the loop, C, are three lugs, G, which extend from the back of the body, A, nearly to the inner face of the body. The function of these lugs will be explained further on.

Each end of the body, A, is "chilled" in the mold, as will be described further on.

The manner of casting will now be described.

The lower mold section is formed with sand facing adapted to form the bottom and side faces of the body casting, the angle plates, H, being placed at the ends of said mold section to form and chill the ends of the body, A, as above described. The inserts, D and E, are placed on the bottom of this mold section in positions as already described. One side face of this mold section is recessed to form the three side lugs, G. The reticulated metal, F, is suitably supported in the position it is to occupy in the finished shoe. The back, B, having the loop, C, attached as above described, is placed into the upper mold section, sand facing being provided for the parts of the shoe which are not to be covered by the back, B. Sand is also placed against the outer face of the back, excepting above and adjacent the apertures, $B^2$ and $B^4$, and the notches, $B^5$, through which the molten metal is to rise, as above described. At those places, the mold is to be recessed above the back to conform to the shape which is to be given to the molten metal above the back. At each end the upper mold section is recessed for forming the transverse extension, $A^4$, of the body, A. Then the molten metal is poured into the mold and allowed to cool, the cooling being slow along the sand faces of the mold and being faster where the molten metal makes contact with the inserts, D and E, and the end plates, H, and with the back, B.

The inserts, D and E, serve to "chill" the adjacent cast metal. They are placed near enough to each other to allow this chilling to include all the cast metal in the spaces between the inserts. A space of one-half an inch has been found satisfactory. In this manner extended chilled areas are provided on the concave or inner face of the shoe.

The inserts, D and E, are omitted at the middle of the shoe, because the chilling which would be produced by the presence of the inserts in that part of the shoe would tend to weaken the shoe. Omitting this chilling makes the metal in the inner part of the cross-section in that part of the body, A, softer and tougher and stronger. Furthermore, while this part of the shoe is thus made stronger, the softness has advantage because it allows more rapid wearing away than in other parts of the face of the shoe. That is desirable, because it permits stronger engagement of the other parts of the face of the shoe with the driver.

One of the purposes of the lugs, G, on the body, A, is to increase the cross-section of the shoe where the lugs are applied and thereby make those parts of the body stronger.

These lugs are located at the points where the shoe usually tends to crack and break in service, particularly after considerable wear. The middle lug is at a point of pressure, and there the body of the shoe is weakened by the insertion of the loop, C. The other lugs are between points of pressure or at points of great strain. The lugs placed at those points give increased cross-section to the body, A, at those points. It is also to be noted that, when the molten metal is poured into the mold, the part of said metal which comes into contact with the metal back, B, becomes chilled; but the lugs, G, are outside of the area of chilling action exerted by the back, B. Hence the metal in the lugs is softer and tougher and stronger than is the part of the metal which is chilled by the back. As above stated, the inserts, E, do not extend to the adjacent upright edge of the body, A. It is intended that the metal intermediate the lugs and the inserts shall be sufficiently thick to limit the chilling actions of the inserts, E, to such intermediate metal, whereby the lugs are left soft and tough.

A further purpose is to use these lugs as a means to aiding retaining the shoe on the rim of the drive wheel, W, when a considerable part of the shoe has been worn away so that the shoe takes the form illustrated by Fig. 16, wherein the shoe has been worn away to such extent as to leave only parts of the inserts and to leave the inner ends of the lugs, G, projecting inward beyond the inner or working face of the shoe. These projecting parts of the lugs, G, will extend over the edge of the drive wheel and supplement the action of the extension, $A^2$, as means to limit sidewise movement of the shoe on the drive wheel. This additional means for retaining the shoe in position is desirable after such reduction of the shoe, because the wearing away of the metal in the channel, $A^1$, may be so uneven or inaccurate as to cause such defective fit on the driver flange as to create danger of failure to hold the shoe against sidewise movement. It is to be noted that the lugs, G, might be extended to and even farther than the inner face of the shoe; but their assistance in holding the shoe on the wheel is not needed until a considerable part of the shoe has been worn away. If the lugs were so extended, they would, after a part of the shoe has been worn away, project so far or be so long as to make them likely to break. Such breaking would probably be at the base of the projecting part of the lugs. Then the lugs could not function as means for holding the shoe in position.

Further, if at the time of casting, these lugs were formed as far as the inner face of the shoe, the adjacent part of the inner face of the shoe would, on account of the large area of molten metal be soft, while hardness in the inner face of the shoe is desired.

By placing a plurality of these lugs on the body, A, the lugs serve to keep the shoe parallel to the plane of the driver.

It is desirable to provide strength and maximum contact and longest wear with a minimum of metal. For that reason the individual lugs are used in lieu of a continuous addition of metal along the edge of the body, A. Such a continuous addition would add to the cross-section of the shoe and would lead to the forming of a continuous flange to assist in holding the shoe on the wheel; but that would add unnecessary metal and weight to the shoe.

I claim as my invention,

1. In a brake shoe, the combination of a cast metal body having its inner face shaped to conform to the tread of a wheel, and metal inserts in said face, the metal of the body in the spaces between said inserts being chilled from one insert to the other, substantially as described.

2. In a brake shoe, the combination of a cast metal body having its inner face shaped to conform to the tread of a wheel, and transverse parallel metal inserts in said face, the metal of the body in the spaces between said inserts being chilled from one insert to the other, substantially as described.

3. In a brake shoe, the combination of a cast metal body having its inner face flat and channeled to conform to the tread and flange of a wheel, and metal inserts in the channel, the metal of the body in the spaces between said inserts being chilled from one insert to the other, substantially as described.

4. In a brake shoe, the combination of a plate metal back having an opening approximately midway between its ends, a loop extending into said opening, a cast metal body, and metal inserts grouped in said body at opposite sides of the transverse middle plane of the shoe, the metal of the body in the spaces between the inserts of each group being chilled from one insert to the other, substantially as described.

5. In a brake shoe, the combination of a cast metal body having its inner face shaped to conform to the tread of a wheel, and a plate metal back having at each end an upturned tongue surrounded by the cast metal body, substantially as described.

6. In a brake shoe, the combination of a cast metal body and a plate metal back having on each end a straight tongue and an up-turned tongue and said tongues being surrounded by the cast metal body, substantially as described.

7. In a brake shoe, the combination of a cast metal body having its inner face flat and channeled to conform to the tread and flange of a wheel, metal inserts in the channel, the metal of the body in the spaces between said inserts being chilled from one insert to the other, and metal inserts in the flat part of the face, the metal of the body in the spaces between said inserts being chilled from one insert to the other, substantially as described.

8. In a brake shoe, the combination of a plate metal back having along one edge a channel in which are apertures, and a cast metal body having parts extending through said apertures and laterally over the plate, substantially as described.

9. In a brake shoe, the combination of a plate metal back having along one edge a channel in which are apertures, and a cast metal body having parts extending through said apertures and laterally over the plate and from one aperture to another aperture, substantially as described.

10. In a brake shoe, the combination of a plate metal back having at each side of its middle transverse plane an elongated slot, and a cast metal body a part of which extends into and above said slots in the form of a transverse lug, substantially as described.

11. The combination of a flanged wheel and a brake shoe which has a cast metal body having along one side edge a channel and having along its other edge lugs, the width of said body between said lugs and said channel being such as to cause said lugs to project laterally beyond the plane of the adjacent edge of the wheel when the shoe is in place on the wheel, substantially as described.

12. The combination of a flanged wheel and a brake shoe which has a cast metal body having along one side edge a channel and having along its other edge lugs reaching from the back face of the body toward its inner face, the width of said body between said lugs and said channel being such as to cause said lugs to project laterally beyond the plane of the adjacent edge of the wheel when the shoe is in place on the wheel, substantially as described.

13. The combination of a flanged wheel and a brake shoe which has a cast metal body having a channel at one edge and having lugs on its other edge, the distance from said edge into said channel being sufficient to allow said lugs to extend over the adjacent edge of the wheel when a part of the shoe has been worn away by the wheel, substantially as described.

14. The combination of a flanged wheel and a brake shoe which has a cast metal body having along one side edge a channel and having along its other edge lugs, the width of said body between said lugs and said channel being such as to cause said lugs to project laterally beyond the plane of the adjacent edge of the wheel when the shoe is in place on the wheel, and a plate metal back secured to said body, substantially as described.

15. The combination of a flanged wheel and a brake shoe which has a cast metal body having along one side edge a channel and having along its other edge lugs reaching from the back face of the body toward its inner face, the width of said body between said lugs and said channel being such as to cause said lugs to project laterally beyond the plane of the adjacent edge of the wheel when the shoe is in place on the wheel, and a plate metal back secured to said body, substantially as described.

16. The combination of a flanged wheel and a brake shoe which has a cast metal body having a channel at one edge and having lugs on its other edge, the distance from said edge into said channel being sufficient to allow said lugs to extend over the adjacent edge of the wheel when a part of the shoe has been worn away by the wheel, and a plate metal back secured to said body, substantially as described.

17. The combination of a flanged wheel and a brake shoe, a plate metal back, a cast metal body lying against said back and formed along one edge to engage the wheel flange and the other edge of the body extending beyond the other edge of the wheel.

18. In a brake shoe, the combination of a plate metal back having an opening approximately midway between its ends, a loop extending through said opening, and a cast metal body formed against said back and channeled along one edge and having on its other edge a lug opposite said loop and having on said edge another lug between said lug and each end of the shoe, substantially as described.

19. The combination of a flanged wheel and a brake shoe which has a plate metal back having a flat portion and a channel along one side edge and having an opening in said flat portion approximately midway between its ends, a loop extending through said opening, and a cast metal body applied to the flat inner face of said plate and into the channel of the plate and having lugs on the opposite edge of the cast metal body, and reaching across the upright plane of the adjacent edge of the wheel, substantially as described.

20. In a brake shoe, a cast metal body, and inserts in the inner face of said body, the inner face of the body being chilled from each end to the adjacent insert and from said insert to the next insert, substantially as described.

21. The herein described method of operating a channeled brake shoe on a car wheel having at one edge of its tread a flange, which method consists in placing the shoe on the tread with the channel in interfitting relation with the flange and with its outer edge projecting laterally beyond the outer edge of the wheel, and then causing the wheel to rotate and wear away the contacting surface only of the shoe so as to leave said projecting portion unworn and in contact with the adjacent side face of the wheel.

In testimony whereof I have signed my name, this 14th day of May, in the year one thousand nine hundred and twenty-six.

CHARLES COBB, Jr.